（12） United States Patent
Blazquez Sanchez (10) Patent No.: US 11,766,740 B2
(45) Date of Patent: Sep. 26, 2023

(54) DEVICE FOR DETERMINING A FOCUS POSITION IN A LASER MACHINING SYSTEM, LASER MACHINING SYSTEM COMPRISING SAME, AND METHOD FOR DETERMINING A FOCUS POSITION IN A LASER MACHINING SYSTEM (71) Applicant: Precitec GmbH & Co. KG, Gaggenau (DE)

(72) Inventor: David Blazquez Sanchez, Gaggenau (DE)

(73) Assignee: Precitec GmbH & Co. KG, Gaggenau (DE)

( * ) Notice: Subject to any disclaimer, the term of this patent is extended or adjusted under 35 U.S.C. 154(b) by 355 days.

(21) Appl. No.: 16/979,098

(22) PCT Filed: Feb. 20, 2019

(86) PCT No.: PCT/EP2019/054141
§ 371 (c)(1),
(2) Date: Sep. 8, 2020

(87) PCT Pub. No.: WO2019/170411
PCT Pub. Date: Sep. 12, 2019

(65) Prior Publication Data
US 2020/0406393 A1 Dec. 31, 2020

(30) Foreign Application Priority Data
Mar. 8, 2018 (DE) .......................... 102018105319.3

(51) Int. Cl.
B23K 26/046 (2014.01)
B23K 26/08 (2014.01)
(Continued)

(52) U.S. Cl.
CPC .......... *B23K 26/046* (2013.01); *B23K 26/064* (2015.10); *B23K 26/0869* (2013.01); *B23K 26/34* (2013.01)

(58) Field of Classification Search
CPC ...... G01J 1/4257; G01J 1/0411; G01J 1/0414; B23K 26/046; B23K 26/064; B23K 26/0869; B23K 26/34
See application file for complete search history.

(56) References Cited

U.S. PATENT DOCUMENTS

2014/0042133 A1* 2/2014 Weick .................. B23K 26/707
219/121.81

FOREIGN PATENT DOCUMENTS

DE 19630607 C1 10/1997
DE 10329744 A1 9/2004
(Continued)

OTHER PUBLICATIONS

International Search Report dated Jun. 6, 2019, International Application No. PCT/EP2019/054141.

*Primary Examiner* — Dana Ross
*Assistant Examiner* — Kuangyue Chen
(74) *Attorney, Agent, or Firm* — DINSMORE & SHOHL LLP (57) ABSTRACT A device for determining a focus position of a laser beam in a laser machining system has a first optical element which is designed to reflect a portion of the laser beam in order to uncouple a first sub-beam of the laser beam, a second optical element which is designed to reflect another portion of the laser beam in order to uncouple a second sub-beam of the laser beam substantially coaxially to the first sub-beam, a spatially-resolving sensor to which the first sub-beam and the second sub-beam can be directed, and an evaluation unit which is designed to determine a focus position of the laser (Continued)

beam on the basis of the first and second sub-beams hitting the spatially-resolving sensor.

13 Claims, 6 Drawing Sheets

(51) Int. Cl.
*B23K 26/064* (2014.01)
*B23K 26/34* (2014.01)

(56) References Cited

FOREIGN PATENT DOCUMENTS

| | | | |
|---|---|---|---|
| DE | 102005016029 A1 | 10/2006 | |
| DE | 102007053632 A1 * | 5/2009 | ........... B23K 26/032 |
| DE | 102007053632 A1 | 5/2009 | |
| DE | 102011007176 A1 | 10/2012 | |
| DE | 102011054941 B3 | 1/2013 | |
| DE | 102017131147 A1 | 6/2019 | |
| DE | 102017131224 A1 | 6/2019 | |
| WO | 2015185152 A1 | 12/2015 | |

* cited by examiner

DEVICE FOR DETERMINING A FOCUS POSITION IN A LASER MACHINING SYSTEM, LASER MACHINING SYSTEM COMPRISING SAME, AND METHOD FOR DETERMINING A FOCUS POSITION IN A LASER MACHINING SYSTEM

CROSS-REFERENCE TO RELATED APPLICATIONS

This application is the U.S. national stage of PCT/EP2019/054141 filed Feb. 20, 2019, which claims priority of German Patent Application 102018105319.3 filed Mar. 8, 2018 both of which are hereby incorporated by reference in their entirety.

FIELD OF THE INVENTION

The present disclosure relates to a device for determining a focus position of a laser beam in a laser machining system, a laser machining system comprising such a device, and a method for determining a focus position of a laser beam in a laser machining system. In particular, the present disclosure relates to a device and a method for determining a focus position of a machining laser beam in real time.

BACKGROUND OF THE INVENTION

In a device for machining material using laser, e.g. in a laser machining head, for example for laser welding or laser cutting, the laser beam exiting from a laser light source or an end of a laser fiber is focused or collimated onto the workpiece to be machined by means of a beam guiding and focusing optics. By default, a laser machining head is used with a collimator optics and a focusing optics, wherein the laser light is supplied via an optical fiber.

A problem in laser material machining is the so-called "thermal lens" due to the heating of optical elements for laser beam guiding and focusing by laser power, in particular in the multi-kilowatt range, and the temperature dependence of the refractive index of optical glasses. In laser material machining, the thermal lens results in a focus shift along the beam propagation direction, which may have a negative effect on the quality of machining.

During the laser material machining process, primarily two mechanisms lead to heating of the optical elements. On the one hand an increase in laser power and on the other hand soiling of the optical elements. Furthermore, it is possible for the optical elements to undergo mechanical deformation, which leads to a change in the refractive index. For example, the mechanical deformation may be caused by a thermal expansion of the socket of the optical elements.

In order to ensure high-quality laser machining, it is necessary to detect the respective focus position and to compensate for the focus position shift, i.e., to provide a fast and accurate focus position control.

DE 10 2007 053 632 B4 describes a device for focusing a laser beam onto a workpiece, comprising at least one transmissive optical element arranged beam at a tilt angle with respect to a plane perpendicular to the beam axis of the laser beam, and a spatially-resolving detector for detecting laser radiation reflected back at the transmissive optical element. From the image captured by the detector, an image evaluation device determines the size or the diameter of the reflected laser radiation on the detector, from which the focus position can be determined for focus position control.

However, a thermal lens (i.e., a thermally induced refractive power or change in refractive power) not only leads to a focus shift, but also to a deterioration in beam quality and can, for example, cause aberrations. This results in a change in the overall beam caustics, e.g. of a focus diameter. The determination of the focus position by a simple comparison with reference values is therefore imprecise. In particular, it does not represent a measurement of the focus position in real time.

SUMMARY OF THE INVENTION

It is an object of the present disclosure to provide a device for determining a focus position of a laser beam in a laser machining system, a laser machining system including such a device, and a method for determining a focus position of a laser beam in a laser machining system that can reliably determine a current focus position of a laser beam. In particular, it is an object of the present disclosure to determine a focus position of a laser beam in real time during a laser machining process.

This object is achieved by the subject matter disclosed herein. Advantageous embodiments of the invention are also disclosed.

According to embodiments of the present disclosure, a device for determining a focus position of a laser beam in a laser machining system is provided. The device comprises a first optical element configured to reflect a portion of a laser beam for outcoupling a first sub-beam of the laser beam, a second optical element configured to reflect another portion of the laser beam for outcoupling a second sub-beam of the laser beam substantially coaxially to the first sub-beam, a spatially-resolving sensor to which the first sub-beam and the second sub-beam can be directed, and an evaluation unit configured to determine a focus position of the laser beam based on the first sub-beam and the second sub-beam hitting the spatially-resolving sensor.

According to further embodiments, a device for determining a focus position of a laser beam in a laser machining system is provided. The device comprises a first surface of a first optical element configured to reflect a portion of the laser beam for outcoupling a first sub-beam of the laser beam; a second surface of the first optical element or a first surface of a second optical element configured to reflect another portion of the laser beam for outcoupling a second sub-beam of the laser beam superimposed substantially coaxially with the first sub-beam; a spatially-resolving sensor for detecting an intensity distribution of the superimposed first and second sub-beams; and an evaluation unit configured to determine a focus position of the laser beam based on the intensity distribution of the first and second sub-beams detected by the spatially-resolving sensor.

According to further embodiments, a device for determining a focus position of a laser beam in a laser machining system is provided. The device comprises two surfaces of at least one optical element, one surface being configured to reflect a portion of the laser beam for outcoupling a first sub-beam and the other surface being configured to reflect another portion of the laser beam for outcoupling a second sub-beam superimposed substantially coaxially with the first sub-beam; a spatially-resolving sensor configured to detect an intensity distribution of the superimposed first and second sub-beams; and an evaluation unit configured to determine a focus position of the laser beam based on the intensity distribution of the first and second sub-beams detected by the spatially-resolving sensor. The two surfaces may be opposite surfaces of a single optical element or surfaces of two different optical elements. Further surfaces of optical elements may be configured to outcouple further sub-beams by back reflection. If more than two back reflections or sub-beams are used to determine the focus position, the accuracy can be increased.

According to further embodiments, a device for determining a focus position of a laser beam in a laser machining system is provided. The device comprises at least two surfaces of at least one optical element each configured to reflect a portion of the laser beam for outcoupling a sub-beam, the at least two sub-beams including a first sub-beam and a second sub-beam being superimposed substantially coaxially; a spatially-resolving sensor for detecting an intensity distribution of the superimposed sub-beams; and an evaluation unit configured to determine a focus position of the laser beam based on the intensity distribution of the sub-beams detected by the spatially-resolving sensor.

By detecting and evaluating the intensity distribution of at least two superimposed back reflections or the at least two sub-beams, two measurements corresponding to two different positions along the beam axis are carried out simultaneously. A number of the sub-beams, e.g. in the intensity distribution, may be known. An optical path length of a sub-beam and/or differences between the optical path lengths of the sub-beams may also be known. Beam diameters of the sub-beams can be determined from the intensity distribution. A distance between the beam diameters may correspond to a difference between the optical path lengths of the sub-beams. Therefrom a beam caustic of the laser beam can be determined using a model or a function. Instead of an intensity distribution, measurements of other parameters of the sub-beams by the spatially-resolving sensor are also conceivable.

The sensor does not have to be in a position corresponding to the focus position, but may be positioned independently of the focus position.

Preferred optional embodiments and special aspects of the disclosure are apparent from the dependent claims, the drawings and the present description.

According to the invention, at least one optical element or at least two optical elements are used for outcoupling at least two substantially coaxial back reflections from the beam path of the laser beam. The coaxial back reflections are directed to a spatially-resolving sensor, whereby a focus position of the laser beam can be determined in real time (online) from the data measured by the spatially-resolving sensor. In particular, a model or a model function may be used to evaluate the beam caustic and to infer the focus position.

The first optical element and/or the second optical element are preferably transmissive optical elements. The transmissive optical element may be configured to transmit a first portion of the laser beam and to reflect at least a second portion of the laser beam. The second portion of the laser beam reflected, for example, from a surface of the element may form the first sub-beam or the second sub-beam. As a result, a portion of the laser beam, which may be a machining laser beam, is coupled out of the beam path and used to determine the focus position of the laser beam.

The first optical element and the second optical element are preferably arranged one after the other in the beam path of the laser beam, and in particular directly one after the other. The first optical element and the second optical element may be arranged in parallel to one another and perpendicularly to an optical axis. The first optical element and the second optical element may be separate optical elements arranged at a distance from one another along the beam path. By means of to the two separate optical elements, the first sub-beam and the second sub-beam can be oriented substantially coaxially with one another.

According to embodiments, the first optical element and the second optical element may be arranged in a focal region of the laser beam. In particular, the first optical element and the second optical element may be arranged between a focusing optics and a focus position (or a machining region of the laser beam, such as a workpiece).

The first optical element and/or the second optical element are preferably protective glasses. The protective glasses may be arranged on the beam output side on a laser machining system, such as a laser machining head. The protective glasses may be provided in order to protect the (optical) elements within the laser machining system, and in particular the focusing optics, from soiling which may be caused, for example, b by splashing or smoldering.

Typically, the first optical element has a first surface and a second surface opposite the first surface, the first sub-beam being reflected from the first surface. The first optical element may be configured such that the second surface of the first optical element reflects a third sub-beam. As a result, one back reflection each, which can be directed to the spatially-resolving sensor, is generated by the two opposite surfaces of the first optical element.

Typically, the second optical element has a first surface and a second surface opposite the first surface, the second sub-beam being reflected from the first surface. The second optical element may be configured such that the second surface of the second optical element reflects a fourth sub-beam. As a result, one back reflection each, which can be directed to the spatially-resolving sensor, is generated by the opposite surfaces of the second optical element.

One or more surfaces of the at least one optical element may be coated in order to increase or reduce reflections. For example, an optical element may have a first surface and a second surface, at least one of the two surfaces having a coating that increases or decreases reflections. As a result, a (reduced) back reflection from one of the surfaces may be negligible compared to an (increased) back reflection from another surface. The number of sub-beams taken into account or used to determine the focus position may be adjusted by means of such coatings.

According to embodiments, the evaluation unit is configured to determine the focus position of the laser beam based on a position and/or an extent of at least the first sub-beam and the second sub-beam on the spatially-resolving sensor. For example, the evaluation unit may be configured to characterize beam properties measured by the spatially-resolving sensor by means of a model or a model function in order to derive the focus position of the laser beam therefrom. In particular, a focus position may be determined from a diameter of the first sub-beam and the second sub-beam by means of the model function (e.g., by a fit). The model function may comprise a fit function for determining a beam caustic of the laser beam.

Preferably at least four back reflections of the two optical elements are used to determine the focus position, namely the first sub-beam and the third sub-beam of the first optical element and the second sub-beam and the fourth sub-beam of the second optical element. In particular, the diameter of the four back reflections may be evaluated by means of the model function in order to evaluate the beam caustic, for example by fitting a target position from the model and measured diameters.

In some embodiments, the device comprises a beam splitter in the beam path of the laser beam, the beam splitter being configured to transmit the laser beam and to reflect at least the first sub-beam and the second sub-beam (and optionally the third sub-beam and the fourth sub-beam) towards the spatially-resolving sensor. The beam splitter may be a partially transmitting mirror. The beam splitter may be arranged in a tilted manner with respect to an optical axis of the laser machining system in order to deflect the back reflections away from the beam path of the laser beam. For example, the beam splitter may be tilted by about 45° with respect to the optical axis in order to outcouple the back reflections substantially perpendicularly to the beam path of the laser beam or to the optical axis of the laser machining system.

According to embodiments, the device may have an optics for imaging the first sub-beam and the second sub-beam (and optionally the third sub-beam and the fourth sub-beam) onto the spatially-resolving sensor.

The device preferably comprises at least one optical filter for the first sub-beam and the second sub-beam (and optionally the third sub-beam and the fourth sub-beam). The optical filter may optically filter the back reflections such that wavelengths or wavelength ranges suitable or optimal for detection reach the spatially-resolving sensor. Hence, for example, background or noise in the sensor signal can be reduced. Alternatively or additionally, a filter may also be used to adjust signal strength at the sensor, such as an attenuating filter.

According to a further aspect of the present disclosure, a laser machining system is provided. The laser machining system comprises a laser device for providing a laser beam, a focusing optics for focusing the laser beam onto a workpiece and the above-described device for determining a focus position of a laser beam in a laser machining system. The laser machining system may be a laser cutting head or a laser welding head.

The laser machining system preferably comprises a collimator optics for collimating the laser beam provided by the laser device. In particular, the first optical element and the second optical element of the device for determining a focus position may be arranged in a focus region of the focusing optics, i.e., in the beam path downstream of the focusing optics. The beam splitter may be arranged in the beam path of the laser beam between the focusing optics and the collimator optics.

According to embodiments of the present disclosure, a method for determining a focus position of a laser beam in a laser machining system is provided. The method comprises outcoupling a first back reflection from a first optical element arranged in a beam path of the laser beam, outcoupling a second back reflection from a second optical element arranged in the beam path of the laser beam, the first back reflection and the second back reflection being substantially coaxial, and determining a focus position of the laser beam based on diameters of the first back reflection and the second back reflection.

According to further embodiments of the present disclosure, a method for determining a focus position of a laser beam in a laser machining system is provided, comprising the steps of: outcoupling at least one of a first and a second back reflection from at least one optical element arranged in a beam path of the laser beam; detecting a spatially-resolved intensity distribution of the first sub-beam and the second sub-beam; and determining a focus position of the laser beam based on the detected spatially-resolved intensity distribution. The first and second back-reflections or reflected sub-beams may occur on different faces (i.e., surfaces) of one and the same optical element, or on surfaces of two different optical elements. It is also possible to use more than two back reflections from different surfaces from more than one optical element. This may increase the accuracy of the determination of the focus position.

The method preferably further comprises: adapting or controlling the focus position based on the determined focus position, optionally using a target focus position.

The method may comprise and implement the features and properties of the device for determining a focus position of a laser beam in a laser machining system and of the laser machining system according to the embodiments described herein.

From the intensity distribution, beam diameters of the first and second sub-beams can be determined, which are used to determine the focus position. In order to determine the focus position, a function or a model for a beam caustic can be used for describing a change in a beam diameter as a function of a position along a beam propagation direction. A number of back reflections or sub-beams used to determine the focus position may be known or specified in advance. Moreover, a distance between the surfaces at which the sub-beams are, i.e. at which the back reflections are produced, may be known or specified. The distance may, for example, correspond to a thickness of the at least one optical element or a distance between a plurality of optical elements or a combination thereof. A distance between the determined beam diameters of the first and second sub-beams can be determined therefrom.

BRIEF DESCRIPTION OF THE DRAWINGS

Embodiments of the disclosure are illustrated in the figures and will be described in more detail below. In the figures.

EMBODIMENTS OF THE DISCLOSURE

In the following, unless otherwise noted, the same reference numerals will be used for the same and for equivalent elements.

Figure 1:
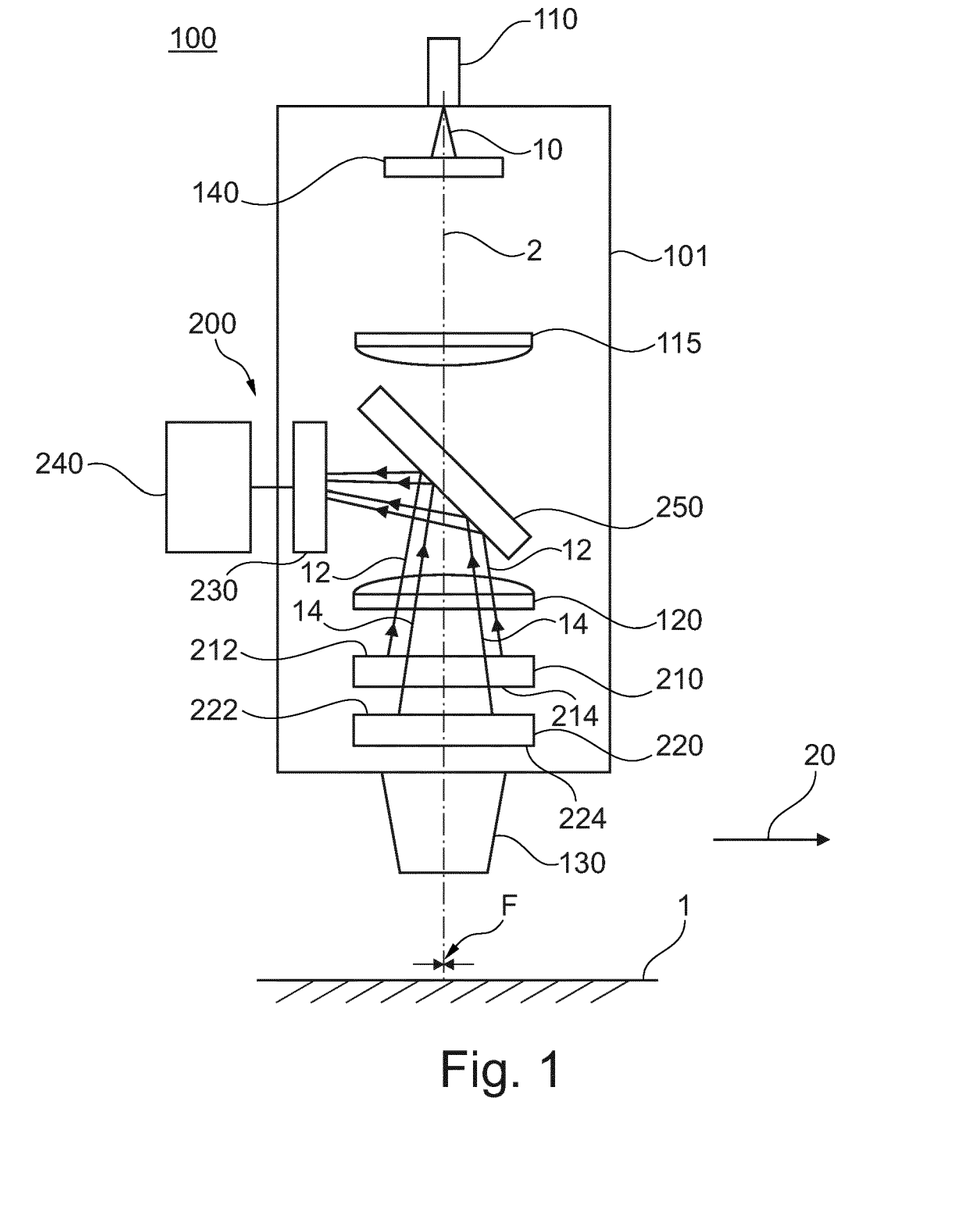
FIG. 1 is a schematic showing a laser machining system with a device for determining a focus position of a laser beam in a laser machining system according to embodiments of the present disclosure.

FIG. 1 shows a laser machining system 100 according to embodiments of the present disclosure. The laser machining system 100 may comprise a machining head 101, such as a cutting head or welding head. FIG. 1 shows, by way example, a straight structure of the laser machining system 100 or of the beam path of the laser beam 10. It will be understood, however, that it is also possible to have an angled structure, e.g. at an angle of 90°. For the sake of clarity, the laser beam 10 is merely indicated and its beam path is not shown completely.

The laser machining system 100 comprises a laser device 110 for providing a laser beam 10 (also referred to as a "machining beam" or "machining laser beam"). The laser device 110 may comprise an optical fiber or be an optical fiber via which the laser beam 10 is guided into the machining head 101. The laser machining system 100 may comprise a collimator optics 115, such as a collimator lens or a zoom system with a plurality of lenses, for collimating the laser beam 10. The laser beam 10 may propagate from the laser device 110 via an optional optical device 140, which may be a protective glass in front of the collimator optics, a lens or aperture, or combinations thereof, to the collimator optics 115.

Typically, the laser machining system 100 comprises a focusing optics 120, such as a focus lens, for focusing the laser beam 10 onto a workpiece 1. The collimator optics 115 and the focusing optics 120 may be integrated into the machining head 101. For example, the machining head 101 may comprise a collimator module which is integrated with the machining head 101 or mounted on the machining head 101.

According to embodiments, the laser machining system 100 or parts thereof, such as the machining head 101, may be movable along a machining direction 20. The machining direction 20 may be a welding direction and/or a moving direction of the laser machining system 100, such as the machining head 101, with respect to the workpiece 1. In particular, the machining direction 20 may be a horizontal direction. The machining direction 20 may also be referred to as "feed direction".

The laser machining system 100 or the laser machining head 101 comprises the device 200 for determining a focus position of the laser beam 10 according to the embodiments of the present disclosure. The device 200 shown in FIGS. 1 and 2 comprises a first optical element 210 configured to reflect a first sub-beam 12 of the laser beam 10, a second optical element 220 configured to reflect a second sub-beam 14 of the laser beam 10 (preferably substantially coaxially to the first sub-beam 12), a spatially-resolving sensor 230, to which the first sub-beam 12 and the second sub-beam 14 can be directed, and an evaluation unit 240 configured to determine a focus position F of the laser beam 10 based on the first and second sub-beams 12 and 14 that hit the position-resolving sensor 230. The first optical element 210 and the second optical element 220 are preferably arranged in parallel to one another in the beam path of the machining head 101. The optical elements 210 and 220 may be arranged downstream of a focusing optics 120 in the beam path. Alternatively, the optical device may also comprise only one optical element 210 with two surfaces, the first surface 212 being configured to reflect the first sub-beam 12 of the laser beam 10 and the second surface 214 opposite the first surface 212 being configured to reflect the second sub-beam 14 of the laser beam 10. Furthermore, more than two back reflections may be used to determine the focus position, as is described below.

Figure 2:
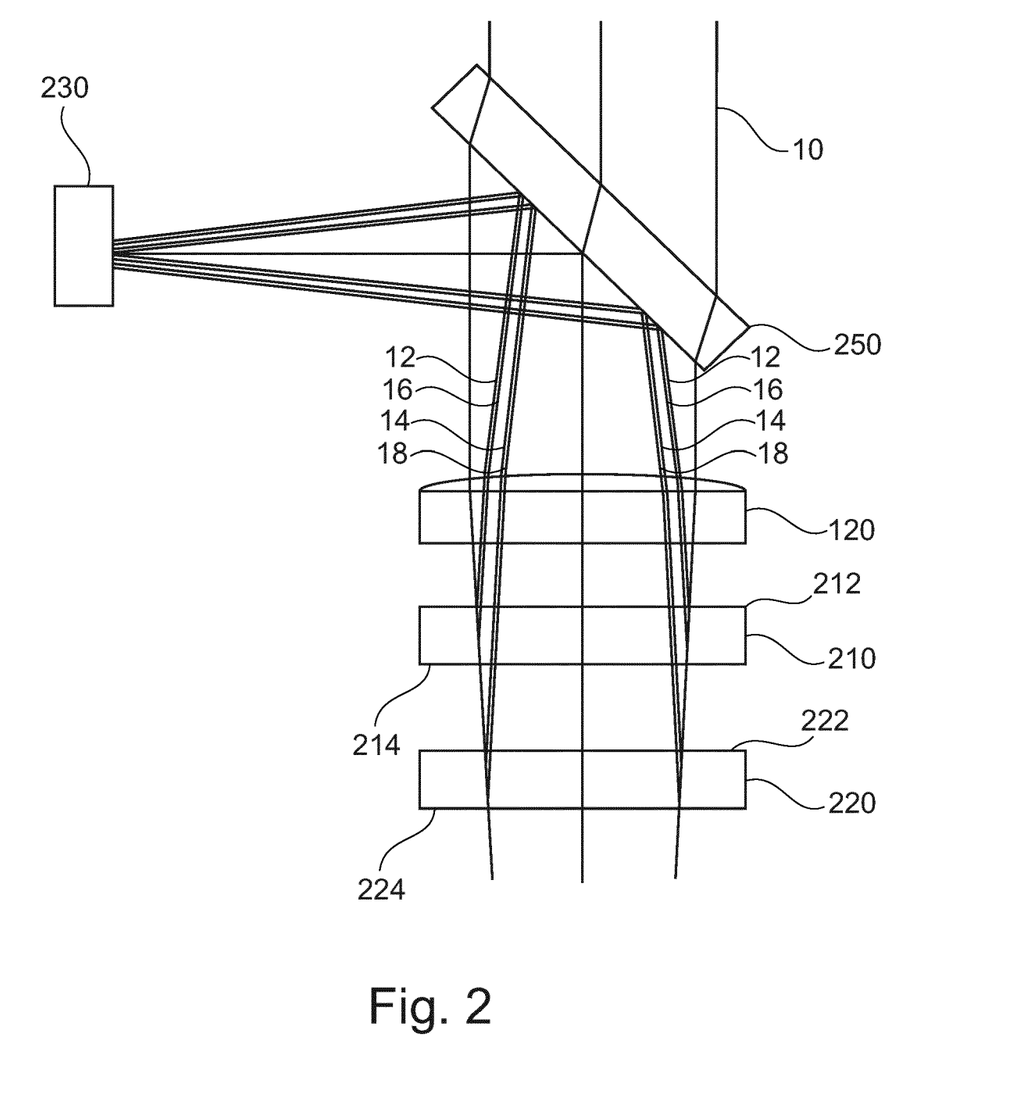
FIG. 2 is a schematic showing the device for determining a focus position of a laser beam in a laser machining system as well as a focusing optics of the laser machining system according to embodiments of the present disclosure.

In particular, the first optical element 210 is arranged in the beam path of the laser beam 10 and couples a portion of the laser beam 10 forming the first sub-beam 12 (and an optional third sub-beam, described later) out of the laser beam 10. The second optical element 220 is also arranged in the beam path of the laser beam 10 and couples another portion of the laser beam 10 forming the second sub-beam 14 (and an optional fourth sub-beam, described later) out of the laser beam 10. In particular, the second optical element 220 outcouples a portion of the laser beam transmitted by the first optical element 210 forming the second sub-beam 14 (and the optional fourth sub-beam, described later).

According to the invention, at least one optical element is used to couple at least two substantially coaxial back reflections out of the beam path of the laser beam. The coaxial back reflections are directed to a spatially-resolving sensor, wherein a focus position of the laser beam can be determined in real time (online) from the data measured by the spatially-resolving sensor. The optical element may be, for example, a protective glass arranged after the focusing optics. As a result, a system for laser material machining which allows for focus position measurement in real time and thereby also control of the focus position in real time can be provided in a structurally compact and modular manner.

The focus position F of the laser beam 10 may be defined or determined substantially in parallel to an optical axis 2 of the laser machining system 100. In FIG. 1, the focus position F is shown, by way of example, above a surface of the workpiece 1. According to embodiments, the laser machining system 100 may comprise a mechanism for adjusting the focus position. Based on the focus position F determined by the device 200, the mechanism can change the focus position F or adjust it to a target value. For example, the focus position F may be adjusted such that it is located in a region of the workpiece 1, such as on a surface thereof or within the workpiece 1. The mechanism for adjusting the focus position F may, for example, comprise an actuator displacing at least one optical element of the beam guiding optics, such as the collimator optics 115 and/or the focusing optics 120, for focus position control.

In some embodiments, the device 200 comprises a beam splitter 250 in the beam path of the laser beam 10, Said beam splitter 250 being configured to transmit the laser beam 10 and reflect the back reflections, i.e. at least the first sub-beam 12 and the second sub-beam 14, to the spatially resolving sensor 230. In other words, the beam splitter 250 may be configured to outcouple coaxial back reflections from the optical elements 210 and 220 and to direct them to the spatially-resolving sensor 230. The beam splitter 250 is typically a partially transmitting mirror. The beam splitter 250 may be arranged in a tilted manner with respect to the optical axis 2 of the laser machining system 100 in order to deflect the back reflections away from the beam path of the laser beam 10. For example, the beam splitter 250 may be tilted by about 45° with respect to the optical axis 2 in order to deflect the back reflections substantially perpendicular to the beam path of the laser beam 10 or to the optical axis 2 of the laser machining system 100 and to direct them towards the spatially-resolving sensor 230. The beam splitter 250 is typically arranged in the beam path of the laser beam 10 between the focusing optics 120 and the collimator optics 115.

The first optical element 210 and the second optical element 220 of the device 200 may be arranged in a focal region of the focusing optics 120, that is, in the beam path of the laser beam 10 following the focusing optics 120. In particular, the first optical element 210 and the second optical element 220 may be arranged between the focusing optics 120 and the focus position F. Typically, the first optical element 210 and the second optical element 220 are arranged between the focusing optics 120 and a beam nozzle 130 in order to protect the interior of the machining head 101 and in particular the focusing optics 120 from soiling.

In some embodiments, the first optical element 210 and/or the second optical element 220 are transmissive optical elements. The transmissive optical element may be configured to transmit a first portion of the laser beam 10 and to reflect at least a second portion of the laser beam 10. The first portion of the laser beam 10 may be directed onto the workpiece 1 for material machining. The second portion of the laser beam may be coupled out of the beam path and used to determine the focus position F of the laser beam 10. In other words, the sub-beams of the laser beam are outcoupled portions or beam portions of the laser beam 10, which is also referred to as the "main beam".

The first optical element 210 and the second optical element 220 may be arranged one after the other in the beam path of the laser beam 10, and in particular directly one after the other. Immediately one after the other means that no further optical elements are present or arranged between the first optical element 210 and the second optical element 220. The first optical element 210 and the second optical element 220 may, in particular, be separate optical elements arranged at a distance from one another along the beam path. By means of the two separate optical elements, the first sub-beam 12 and the second sub-beam 14 can be oriented substantially coaxially with one another.

The first optical element 210 and/or the second optical element 220 are typically made of glass, and may in particular be protective glasses. The protective glasses may be arranged on the beam outlet side on the beam nozzle 130. The protective glasses may be provided in order to protect the (optical) elements within the laser machining system, and in particular the focusing optics 120, from soiling, which may be caused, for example, by splashing or smoldering.

The first optical element 210 has a first surface 212 and a second surface 214 opposite the first surface 212. The surfaces may be planar surfaces. Typically, the first surface 212 and the second surface 214 are substantially parallel to one another. The first sub-beam 12 may be reflected from the first surface 212 or the second surface 214. The second optical element 220 has a first surface 222 and a second surface 224 opposite the first surface 222. The surfaces may be planar surfaces. Typically, the first surface 222 and the second surface 224 are substantially parallel to one another. The second sub-beam 14 may be reflected from the first surface 222 or the second surface 224.

The surfaces from which the first sub-beam 12 and the second sub-beam 14 are reflected can be oriented the same way. For example, the surfaces may comprise upper or first and lower or second surfaces of one and the same optical element. In the case of two optical elements, the surfaces may be upper or first surfaces of the first optical element 210 and of the second optical element 220 with respect to a direction of propagation of the laser beam 10, that is, from the laser device 110 to the workpiece 1. In another example, the surfaces may be lower or second surfaces of the first optical element 210 and the second optical element 220.

According to embodiments, the first optical element 210 and/or the second optical element 220 are oriented substantially perpendicular to the optical axis 2 of the laser machining system 100. In other words, the first optical element 210 and the second optical element may be oriented substantially in parallel to one another. In particular, at least one of the first surface 212 and the second surface 214 of the first optical element 210 and/or of the first surface 222 and the second surface 224 of the second optical element 220 may be oriented substantially perpendicular to the optical axis. However, the present disclosure is not limited thereto and the first optical element 210 and/or the second optical element 220 may be tilted with respect to the optical axis 2 or have surfaces that are oriented at an angle other than 90° to the optical axis 2.

Any sensor may be used as the spatially-resolving sensor 230 with which, for example, a diameter of the beam incident on the spatially-resolving sensor 230, that is, of the sub-beams 12 or 14, can be determined. For example, a camera is used as the spatially-resolving sensor 230, the sensor surface of which is formed by a CCD sensor, for example.

According to embodiments, the evaluation unit 240 is configured to determine the focus position F of the laser beam 10 on the spatially-resolving sensor 230 based on a position and/or an extent, and in particular a diameter, of at least the first sub-beam 12 and the second sub-beam 14. For example, the evaluation unit 240 may be configured to characterize beam properties measured by the spatially-resolving sensor 230 by means of a model or a model function in order to derive the focus position F of the laser beam 10 therefrom. In particular, the focus position F can be determined from a diameter of the first sub-beam 12 and the second sub-beam 14 by means of the model function (e.g., by a fit). In other words, the focus position F can be calculated from the diameters.

The model or the model function may be robust in terms of manufacturing tolerances, i.e., if there is no perfect concentricity of beam diameters or if fluctuations in the residual reflections of coatings and deviations in the relevant thicknesses or distances are present, etc.

In some embodiments, the device 200 may have an optics for imaging the back reflections, such as the first sub-beam 12 and the second sub-beam 14, onto the spatially-resolving sensor 230.

In further embodiments, the device 200 optionally comprises at least one optical filter for the back reflections, such as the first sub-beam 12 and the second sub-beam 14. The optical filter may optically filter the back reflections such that wavelengths suitable or optimal for detection reach the spatially-resolving sensor 230. As a result, for example, background or noise in the sensor signal can be reduced. The optical filter may also comprise a filter for adapting signal strength for the spatially-resolving sensor 230.

FIG. 2 shows the device 200 for determining the focus position and the focusing optics 120 according to embodiments of the present disclosure.

The first optical element 210 has the first surface 212 and the second surface 214 opposite the first surface 212. The second optical element 220 has the first surface 222 and the second surface 224 opposite the first surface 222. In some embodiments, a back reflection (sub-beam), which is directed onto the spatially resolving sensor 230, is generated from each of the two opposite surfaces of the first or second optical element. In this way, the back reflection from all four planar surfaces of the protective glasses may be coupled out of the main beam using the beam splitter and directed (optionally with imaging optics) onto the spatially-resolving sensor. The image of the spatially resolving sensor may be evaluated in the evaluation unit using a model (function) based on four coaxial beam diameters in order to determine the focus position of the laser beam.

The first optical element 210 may be configured to reflect the first sub-beam 12 and a third sub-beam 16. The first sub-beam 12 may be reflected from the first surface 212 of the first optical element 210, and the third sub-beam 16 may be reflected from the second surface 214 of the first optical element 210. The second optical element 220 may be configured to reflect the second sub-beam 14 and a fourth sub-beam 18. The second sub-beam 14 may be reflected from the first surface 222 of the second optical element 220, and the fourth sub-beam 18 may be reflected from the second surface 224 of the second optical element 220.

Thus, at least four back reflections of the two optical elements can be used to determine the focus position, namely the first sub-beam 12 and the third sub-beam 16 of the first optical element 210 and the second sub-beam 14 and the fourth sub-beam 18 of the second optical element 220. In particular, the diameters of the four back reflections may be evaluated by means of the model function in order to determine the focus position, for example via a fit. The first sub-beam 12, the second sub-beam 14, the third sub-beam 16, and the fourth sub-beam 18 may be substantially coaxial and, in particular, may hit the spatially-resolving sensor substantially coaxially.

Figure 3:
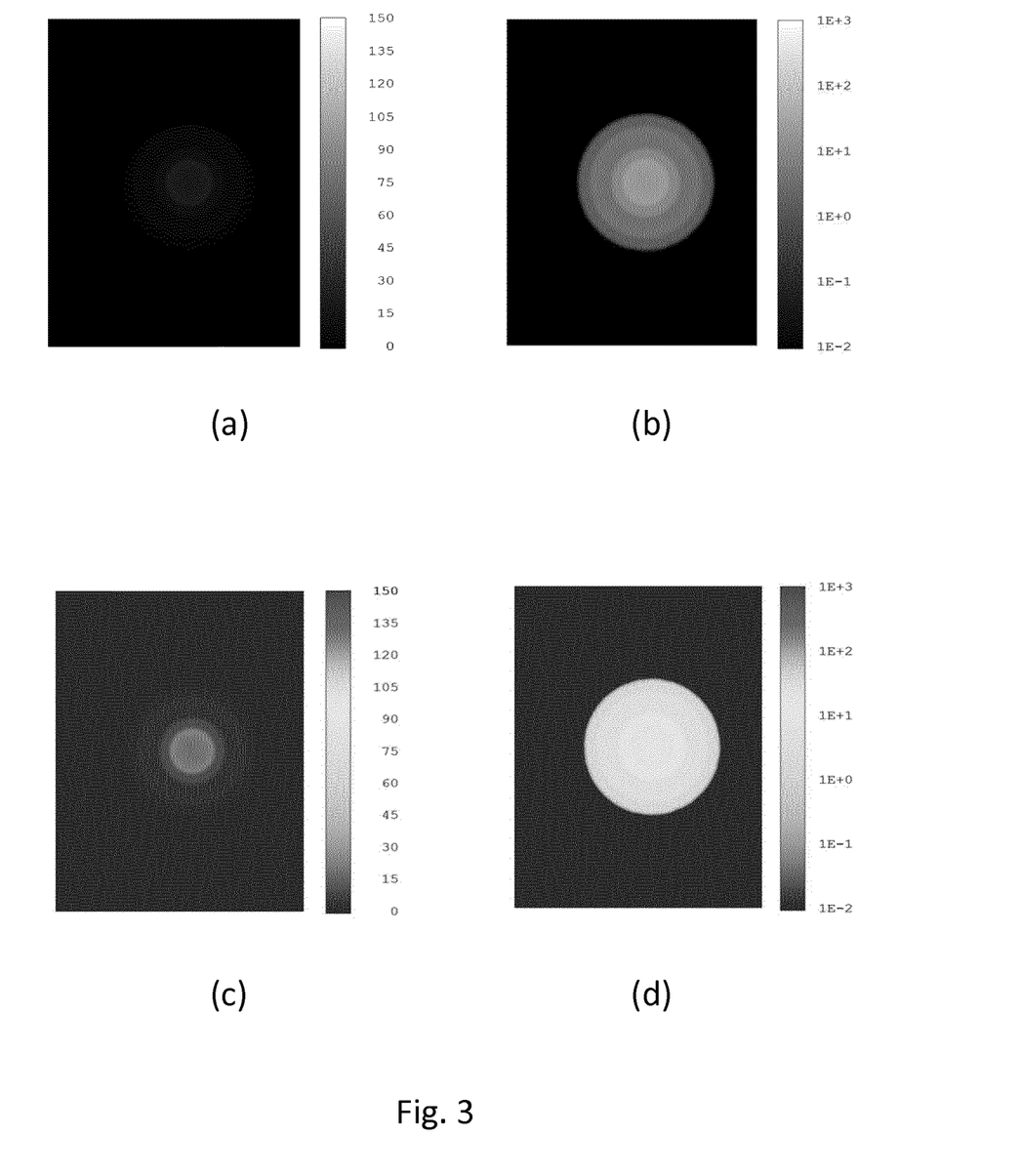
FIGS. 3A-D are images showing simulations of outcoupled back reflections of the laser beam recorded with a spatially-resolving detector of the device for determining a focus position of a laser beam in a laser machining system according to the embodiments of the present disclosure, FIGS. 4A and B are plots showing evaluations of the simulations of FIG. 3, FIGS. 5A-D are images showing simulations of outcoupled back reflections of the laser beam recorded with a spatially resolving detector of the device for determining a focus position of a laser beam in a laser machining system, for a different focus position or collimation position, FIGS. 6A and B are plots showing evaluations of the simulations of FIG. 5.

FIG. 3 shows simulations of outcoupled back reflections of the laser beam recorded with a spatially-resolving sensor or detector. The illustrations correspond to the intensity distribution of the back reflections or the sub-beams arriving superimposed on the sensor in mW/cm$^2$ or in arbitrary units. FIG. 3(a) shows an inverted gray scale representation of the simulated signal of the spatially-resolving sensor on a linear scale. FIG. 3(b) shows an inverted gray scale representation of the simulated signal of the spatially-resolving sensor on a logarithmic scale. FIG. 3(c) shows a false color representation of the simulated signal on a linear scale. FIG. 3(d) shows a false color representation of the simulated signal on a logarithmic scale.

Figure 4A:
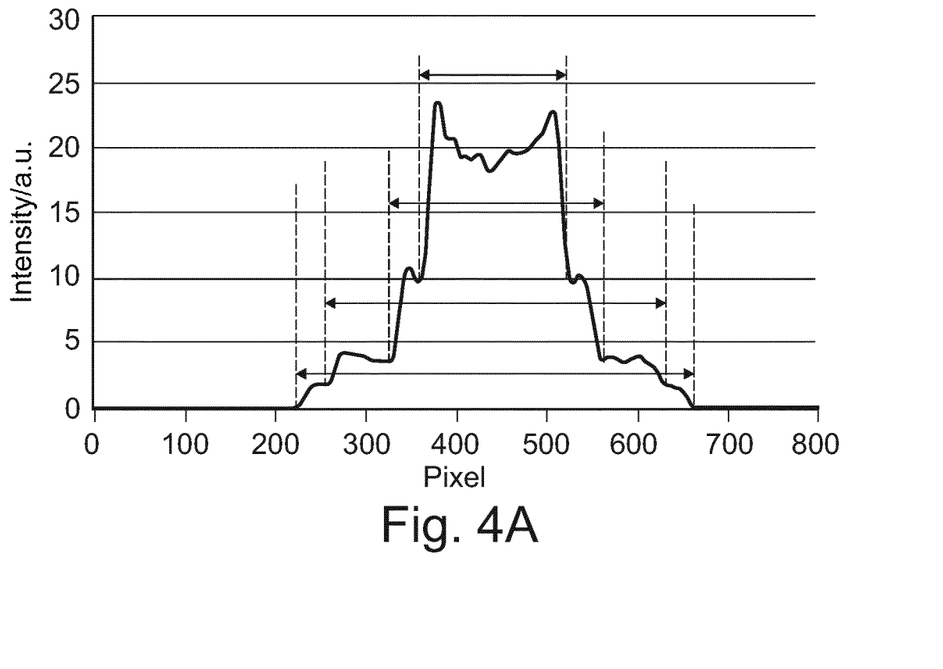
Figure 4B:
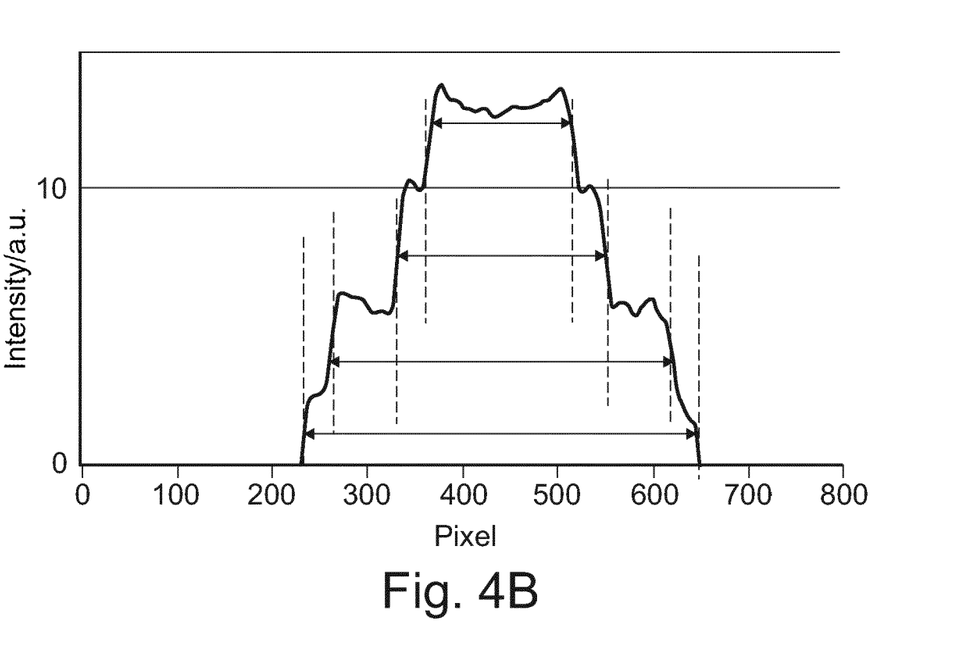

FIG. 4 shows evaluations of the simulations of FIG. 3. In particular, sections are shown in which the diameters of the back reflections are apparent. There are a total of four diameters of four back reflections generated by the four planar surfaces of the two optical elements (arrows). FIG. 4A shows a linear scale, that is, the evaluation of the simulations shown in FIGS. 3(a) and (c). FIG. 4B shows a logarithmic scale, that is, the evaluation of the simulations shown in FIGS. 3(b) and (d).

Figure 5:
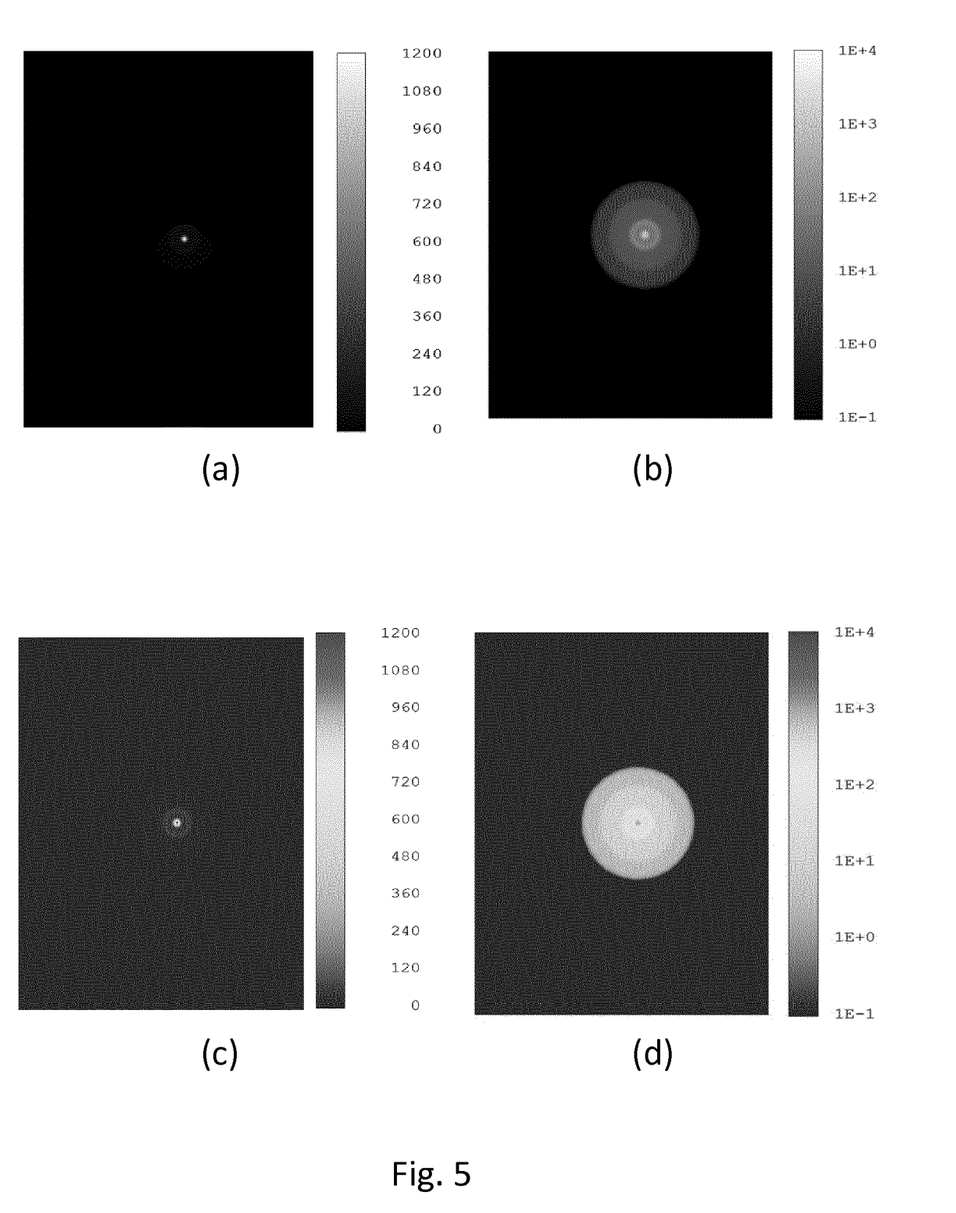
Figure 6A:
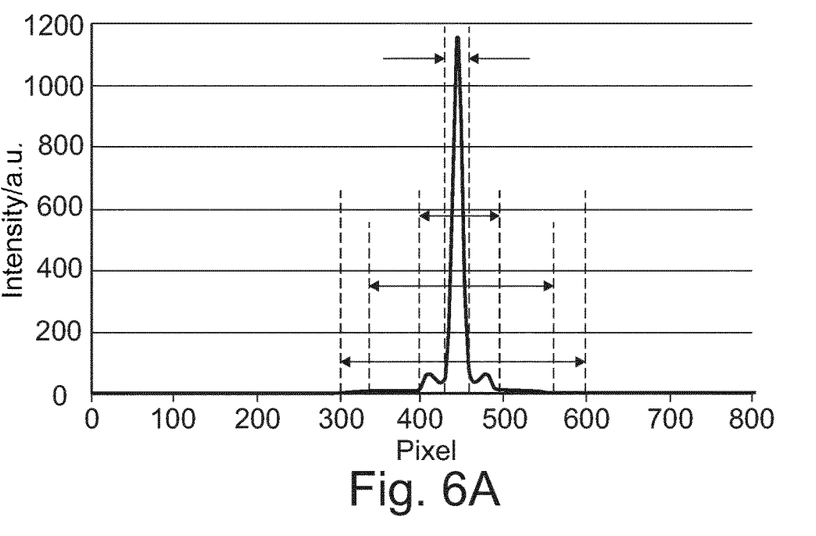
Figure 6B:
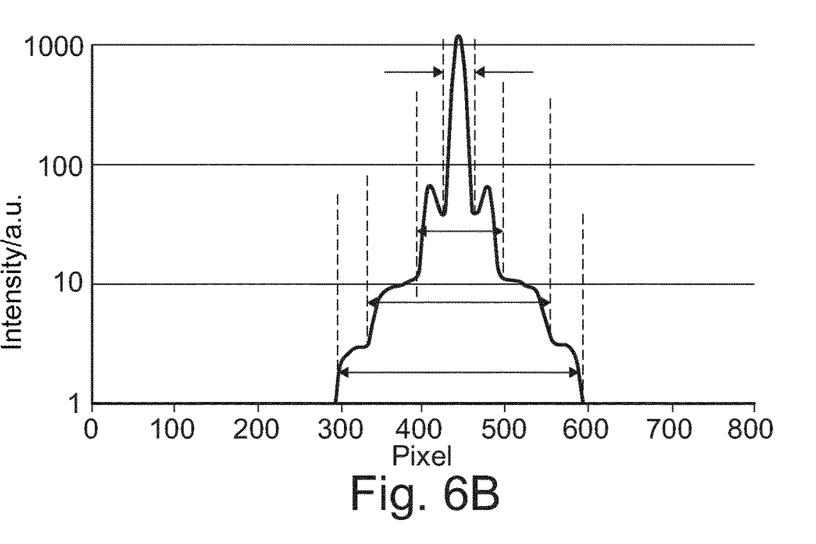

FIGS. 5 and 6 show comparative simulations for a focus position or collimation position different from the one used in the simulations shown in FIGS. 3 and 4.

FIG. 5 shows simulations of outcoupled back reflections of the laser beam recorded with a spatially-resolving detector. The illustrations correspond to the intensity distribution of the incident back reflections or the incident sub-beams in arbitrary units. FIG. 5(a) shows an inverted gray scale representation of the simulated signal on a linear scale (similar to FIG. 3a). FIG. 5(b) shows an inverted gray scale representation of the simulated signal on a logarithmic scale (similar to FIG. 3b). FIG. 5(c) shows a false color representation of the simulated signal on a linear scale (similar to FIG. 3c). FIG. 5(d) shows a false color representation of the simulated signal on a logarithmic scale (similar to FIG. 3d).

FIG. 6 shows evaluations of the simulations of FIG. 5. In particular, sections of the simulations are shown in which the diameters of the back reflections are apparent. There are a total of four diameters of four back reflections generated by the four planar surfaces of the two optical elements. FIG. 6A shows a linear scale, that is, the evaluation of the simulations shown in FIGS. 5(a) and (c). FIG. 6B shows a logarithmic scale, that is, the evaluation of the simulations shown in FIGS. 5(b) and (d).

Figure 7:
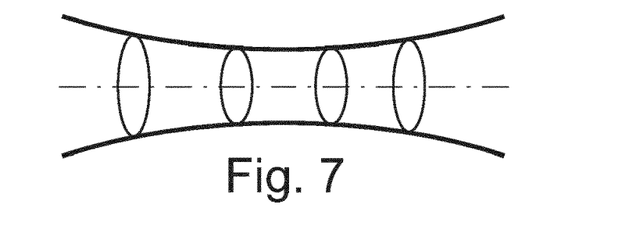
FIG. 7 is a schematic beam caustic of a laser beam.

The change in the beam diameter depending on the direction of beam propagation is mathematically described with the so-called beam caustic. FIG. 7 shows a schematic beam caustic of a laser beam, wherein the beam diameters (corresponding to the circles in FIG. 7) determined using the measurement data and a model are fitted by means of the model to form a beam caustic (the envelope in FIG. 4) in order to characterize the beam and, in particular, to determine the focus position, i.e., the position of the smallest diameter of the beam. The model describes, for example, the difference between the optical paths of the at least two back reflections. If an imaging optics is arranged in front of the sensor 230, this can be taken into account in the model.

According to the invention, at least one optical element is used in order to couple at least two substantially coaxial back reflections out of the laser beam. Alternatively, two optical elements may also be used to generate at least two substantially coaxial back reflections or sub-beams. A protective glass may be used as the optical element. This allows for a simple modular integration into a laser machining head. A beam splitter may be used for outcoupling. The coaxial back reflections are directed onto a spatially-resolving sensor, wherein a focus position of the laser beam can be determined in real time (online) from the data measured by the spatially-resolving sensor. In particular, a model or a model function may be used to evaluate the beam caustic and to infer the focus position.

The invention claimed is:

1. A device for determining a focus position of a laser beam in a laser machining system, comprising:
   at least two surfaces of at least one optical element, each configured to reflect a portion of the laser beam for outcoupling a sub-beam such that at least two sub-beams are outcoupled, the at least two sub-beams including a first sub-beam and a second sub-beam being superimposed coaxially;
   a spatially-resolving sensor for detecting an intensity distribution of the coaxially superimposed sub-beams on the spatially-resolving sensor;
   an evaluation unit configured to determine the focus position of the laser beam based on the intensity distribution of the coaxially superimposed sub-beams detected by the spatially-resolving sensor; and
   a beam splitter configured to transmit the laser beam to a workpiece and to reflect the coaxially superimposed sub-beams to the spatially-resolving sensor,
   wherein the evaluation unit is configured to determine diameters of the coaxially superimposed sub-beams based on the intensity distribution of the coaxially superimposed sub-beams detected by the spatially-resolving sensor and to determine the focus position of the laser beam from the diameters of the coaxially superimposed sub-beams.

2. The device according to claim 1, wherein the at least one optical element is a transmissive optical element and/or a protective glass.

3. The device according to claim 1, wherein the at least one optical element is arranged perpendicular to an optical axis of the laser machining system.

4. The device according to claim 1, wherein one of the at least two surfaces and an other of the at least two surfaces are arranged perpendicular to an optical axis of the laser machining system and/or in a focus region of the laser beam.

5. The device according to claim 1, wherein a number of the sub-beams and/or a difference between optical path lengths of the sub-beams is known.

6. The device according to claim 1, wherein the at least one optical element comprises a first optical element having a first of the at least two surfaces, wherein the first sub-beam is reflected from the first surface of the first optical element, and/or wherein the at least one optical element comprises a second optical element having a first surface of the at least two surfaces, wherein the second sub-beam is reflected from the first surface of the second optical element.

7. The device of claim 6, wherein the first optical element further comprises a second surface which is opposite the first surface and configured to reflect a third sub-beam, and/or wherein the second optical element further comprises a second surface which is opposite the first surface and configured to reflect a fourth sub-beam.

8. The device according to claim 1, further comprising an optics for imaging the sub-beams onto the spatially resolving sensor.

9. The device according to claim 1, further comprising at least one optical filter for the sub-beams, the at least one optical filter being arranged between the at least one optical element and the spatially-resolving sensor.

10. A laser machining system comprising:
a laser device for providing a laser beam;
a focusing optics for focusing the laser beam on a workpiece; and
a device for determining a focus position of the laser beam in the laser machining system, comprising:
at least two surfaces of at least one optical element, each configured to reflect a portion of the laser beam for outcoupling a sub-beam such that at least two sub-beams are outcoupled, the at least two sub-beams including a first sub-beam and a second sub-beam being superimposed coaxially;
a spatially-resolving sensor for detecting an intensity distribution of the coaxially superimposed sub-beams on the spatially-resolving sensor;
an evaluation unit configured to determine the focus position of the laser beam based on the intensity distribution of the coaxially superimposed sub-beams detected by the spatially-resolving sensor; and
a beam splitter configured to transmit the laser beam to a workpiece and to reflect the coaxially superimposed sub-beams to the spatially-resolving sensor,
wherein the evaluation unit is configured to determine diameters of the sub-beams based on the intensity distribution of the coaxially superimposed sub-beams detected by the spatially-resolving sensor and to determine the focus position of the laser beam from the diameters of the coaxially superimposed sub-beams.

11. The laser machining system according to claim 10, wherein the at least one optical element is arranged downstream of the focusing optics in a beam path of the laser machining system.

12. The laser machining system according to claim 11, wherein the laser machining system comprises a laser cutting head or laser welding head or is a laser cutting head or laser welding head.

13. A method for determining a focus position of a laser beam in a laser machining system, comprising:
outcoupling at least a first sub-beam and a second sub-beam from at least one optical element arranged in a beam path of the laser beam, wherein the first sub-beam and the second sub-beam are coaxially superimposed, wherein the coaxially superimposed sub-beams are reflected to a spatially-resolving sensor by a beam splitter;
detecting, by the spatially-resolving sensor, a spatially-resolved intensity distribution of the coaxially superimposed sub-beams on the spatially-resolving sensor;
determining diameters of the coaxially superimposed sub-beams based on the intensity distribution of the coaxially superimposed sub-beams; and
determining the focus position of the laser beam based on the determined diameters of the coaxially superimposed sub-beams.

* * * * *